(12) United States Patent
Horo et al.

(10) Patent No.: US 6,592,340 B1
(45) Date of Patent: Jul. 15, 2003

(54) CONTROL SYSTEM FOR A VACUUM PUMP USED FOR REMOVING LIQUID AND A METHOD OF CONTROLLING SAID PUMP

(75) Inventors: Kaarlo Horo, Kyminlinna (FI); Seppo Kupiainen, Karhula (FI)

(73) Assignee: Sulzer Pumpen AG, Winterthur (CH)

( * ) Notice: Subject to any disclaimer, the term of this patent is extended or adjusted under 35 U.S.C. 154(b) by 0 days.

(21) Appl. No.: 09/719,308

(22) PCT Filed: Jun. 10, 1999

(86) PCT No.: PCT/FI99/00507

§ 371 (c)(1),
(2), (4) Date: Dec. 11, 2000

(87) PCT Pub. No.: WO99/64667

PCT Pub. Date: Dec. 16, 1999

(30) Foreign Application Priority Data

Jun. 11, 1998 (FI) .................................................. 981343
Jun. 11, 1998 (FI) .................................................. 981344

(51) Int. Cl.⁷ .................................................. F04B 49/00
(52) U.S. Cl. ........................ 417/293; 417/42; 417/53; 162/252
(58) Field of Search .................... 417/293, 42; 162/252

(56) References Cited

U.S. PATENT DOCUMENTS

| | | | | | |
|---|---|---|---|---|---|
| 2,922,475 | A | * | 1/1960 | Alexander | .................... 162/252 |
| 4,108,574 | A | * | 8/1978 | Bartley et al. | ................. 417/19 |
| 4,121,968 | A | * | 10/1978 | Wells | .......................... 162/290 |
| 4,329,201 | A | | 5/1982 | Bolton | ......................... 162/252 |
| 4,398,996 | A | * | 8/1983 | Bolton et al. | ................ 162/252 |
| 4,466,873 | A | * | 8/1984 | Bolton et al. | ................ 162/252 |
| 4,518,318 | A | | 5/1985 | Jensen et al. | |
| 4,551,202 | A | * | 11/1985 | Bolton et al. | ................ 162/252 |
| 5,314,581 | A | | 5/1994 | Lin et al. | |
| 6,088,508 | A | * | 7/2000 | Ishibashi et al. | ................ 318/3 |

FOREIGN PATENT DOCUMENTS

WO WO 96/15319 5/1996 ................. 162/252

OTHER PUBLICATIONS

Abstract of German Patent No. DE19618462, Nov. 1997.
Abstract of Finnish Patent No. 97244, Nov. 1995.

* cited by examiner

Primary Examiner—Cheryl J. Tyler
(74) Attorney, Agent, or Firm—Nixon & Vanderhye P.C.

(57) ABSTRACT

A control system for a vacuum pump used for removing liquid from a suction washer of a pulp mill includes a pump with adjustable rotation speed and means for defining the operating point of the vacuum pump and a control/central unit wherein the performance chart of the vacuum pump is recorded and wherein the defining data of the vacuum pump operating point is fed. The control system further includes a resistance function on the suction side of the vacuum pump which depicts the suction resistance formed of at least the suction object in the suction side. The resistance function is determined by changing the rotational speed of the vacuum pump and recording the operating points in the control/central unit at various rotational speeds.

35 Claims, 7 Drawing Sheets

CONTROL SYSTEM FOR A VACUUM PUMP USED FOR REMOVING LIQUID AND A METHOD OF CONTROLLING SAID PUMP

The invention relates to a control system for a vacuum pump used for removing liquid and a method of controlling said pump. The vacuum pump arrangement utilized in the invention may be used e.g. in drying machines for paper, paperboard and pulp as well as e.g. in various suction filters and suction washers in a pulp mill. In general, the pump control arrangement according to the invention may be used in all applications where gas, liquid or their mixture is withdrawn through a perforated or wire-like surface.

The use of various vacuum systems as means for facilitating filtration and precipitation is generally known in addition to the paper and wood processing industry, also in e.g. the mining and fertilizing industry. Vacuum systems are utilized in connection with both various wire filters and wire precipitators, into which category the drying machines for paper, paperboard and pulp can be defined, and various vacuum disc or vacuum drum filters. A well-known vacuum arrangement is the use of a barometric leg, by which method the weight of the filtrate flowing into a so-called barometric leg, an essentially vertical tube, creates the necessary vacuum. Because it is practically impossible to regulate the vacuum created by the barometric leg, various vacuum pumps have been employed, the most common of which is the so-called water ring pump. The water ring pump creates typically a constant-volume flow. The suction capacity of the water ring pump may be regulated for example by introducing additional air into the pump through a regulated valve, whereby the amount of gas being withdrawn from the suction object of the pump may be changed.

U.S. Pat. No. 4,329,201 (Albany International Corp.) relates to dewatering the web on the wire. According to said publication, e.g. a liquid ring pump or a centrifugal exhauster may be utilized for water removal. An essential feature of the idea described in the publication is the attempt of using constant vacuum for dewatering. According to the publication, this is achieved by employing in the dewatering system two water removal pipes, over which the wire passes. In the case of a new wire, only one water removal pipe is employed, but when the vacuum in said pipe increases a second pipe is opened and the suction from the vacuum means is applied to the wire also via the second pipe. The solution according to the publication utilizes also a control valve, which, together with the vacuum control, keeps the vacuum applied to the suction means constant. The publication further mentions, how the dwell time of the wire at each suction pipe may be increased, if necessary, by either increasing the width of the suction slot in the suction pipe in the moving direction of the wire or by decreasing the travelling speed of the wire.

Like the previous publication, U.S. Pat. No. 4,466,873 (Albany International Corp.) is also related to dewatering the fourdrinier section of a paper machine. The apparatus of this patent comprises an adjustable-speed vacuum pump, which may be either a conventional vacuum pump or a vacuum centrifugal pump, i.e., centrifugal exhauster. The purpose of the apparatus is to control the dewatering in two phases so that during the first phase the rotational speed of the pump is kept constant, whereby the pump creates a vacuum sufficient for dewatering the web. As the wire gradually clogs, the vacuum in the suction boxes increases. When the vacuum in the last suction box has reached a predetermined value, the control unit enforces the vacuum pump to decrease its rotational speed so that the vacuum remains in said maximum level thereafter.

The newest alternative for suction means in the market is a so-called high-speed vacuum pump, which is, in fact, a centrifugal pump applied for pumping gas. The use of said pump in dewatering in paper production is described in Fl patent 97244. Said publication concerns, e.g., a problem arising with the fabric, felt or wire, of the paper machine gradually tending to be clogged. In other words, the permeability of the fabric changes with the passing of service life. In said publication, the problem is solved so that when the amount of liquid to be removed by applying suction to the object, e.g. a suction box or a group of suction boxes, is known, the amount of liquid removed from said object is measured and compared with the predetermined target value and the operation of the suction system is adjusted accordingly. The easiest method of doing this is to adjust the rotational speed of the vacuum pump, because for example an increase in the rotational speed increases both the volume flow and the vacuum level of the vacuum pump. As a second alternative adjustment, the adjustment of both the rotational speed and the capacity of the vacuum pump, i.e. volume flow, is described.

A problem relating to the solution described in said publication is that the system comprises a mechanical device, flow meter, on which the controlling of the system is based. In addition to being a costly additional investment, said device is sensitive to damages, at least in long-term use, whereby the accuracy of the whole paper production or a corresponding process is endangered. Furthermore, the use of a flow meter, as such, brings no additional value for the system, but other interesting points, such as e.g. monitoring the condition of the suction object, such as the felt or the like, determining the need to change the felt etc. are still existing problems in the described prior art methods.

In the following, the use of a vacuum pump arrangement is described more precisely, as an example in connection with the vacuum system of a paper machine. The applications for the use of both various prior art vacuum pump systems and the method and vacuum pump arrangement of the present invention are, in principle, divided into two categories.

In the first category, suction is effected both to the fabric and the pulp web. In these cases, when the same type of pulp is being treated, the flow resistance remains almost constant regardless of the resistance of the felt, because the resistance of the pulp web is decisive. The flow resistance changes remarkably when the paper grade is changed. The conventional operating method is to determine a constant vacuum level for each paper grade, with the aim to monitor the level during the operation. Typical objects whereto vacuum is applied are, e.g., suction boxes of the web formation section of paper, paperboard and pulp drying machines, various suction rolls in the formation and press sections and various vacuum filters in the causticizing plant of a pulp mill and e.g. in the fertilizing and basic metal industry.

In the second category, vacuum is applied to the fabric only. In this case, the flow resistance increases with the aging of the fabric, due to fouling and compressing of the fabric. Typical suction objects are, e.g., the suction boxes of the felt-conditioning section of a paper machine.

With these suction boxes, placed at the press section of a paper machine, the fabric is dewatered by withdrawing air through it. The three basic functions of felt conditioning are:

1) water removal (part of the water in the fabric has been transferred from the paper web to the fabric on the press section),
2) cleaning (part of the water has come from cleaning jets used for cleaning the fabric) and 3) maintaining a level moisture profile in the fabric in the cross direction of the machine.

Traditionally, a vacuum pump has been used in connection with this kind of applications so that by the vacuum pump a constant-volume flow is withdrawn through the fabric, whereby the vacuum level increases with the aging of the fabric. A running method of this kind is achieved automatically by a displacement-type vacuum pump, e.g. a liquid ring pump.

However, the objective of felt conditioning is not to maximize water removal from the fabric, because an excessively dry fabric does not perform its function properly in the dewatering taking place in the press nip. The amount of air withdrawn through the fabric by means of a suction box is determined so that a suitable moisture ratio is ensured in the fabric. The moisture ratio is the relation of the weight of the water in the fabric to the weight of the fabric. Excessive air flow creates a too low moisture ratio and a too small air flow, accordingly, creates a too high moisture ratio. In practice it has been noticed, though, that said running method based on constant-volume flow does not lead to an optimal moisture ratio, but the moisture ratio varies even to a detrimental extent.

A solution of e.g. the problem mentioned above has shown to be a method of adjusting the vacuum level of felt conditioning by measuring the moisture of the fabric after the suction box and aiming to keep the moisture at a desired level by regulating the rotational speed and operating point of the vacuum pump.

A second possible method for solving e.g. said problem, is to measure the amount of water discharging from the suction box and the amount of spray waters and on that basis try to estimate the moisture of the felt and the vacuum needed. However, an additional problem arises with the estimating of the water amount displaced from the web into the felt in the press nip, which problem, nevertheless, is far from the category of moisture ratio variations of the running method based on constant-volume flow.

When trying to create an optimal running method for paper machines or the like in a case when the suction object comprises both fabric and pulp web, a prior art method is to remove water straight from the pulp by drawing air through the pulp and fabric. In a paper machine, the goal is to remove as much water from the pulp prior to the drying section as possible, because the cost of mechanical water removal (pressing and absorption) is only about a fourth of the cost of water removal carried out on the drying section. However, water removal has to be carried out gradually. For suction objects whereto suction is applied first and where the moisture of the web is the highest, an excessively high vacuum level may not be employed, as it would lead to excessive compression of the pulp web and reduce water removal in the subsequent stages. Conventionally, the aim has been to maintain the vacuum level constant in each suction object. The vacuum level chosen depends on the kind of pulp to be treated.

When using constant-speed liquid ring vacuum pumps, the vacuum level is regulated by means of a vacuum control valve with which a required amount of air is introduced to the vacuum system from outside. This kind of regulation method, spending a lot of energy, is very problematic, as part of the capacity of the vacuum pump is used to pump air from outside.

In the case of this prior art paper machine technology, vacuum systems based on the use of liquid ring pumps have generally been based on technology, according to which the vacuum created by the vacuum pump, or at least the amount of water removed by means of it, is regulated on the basis of experience. For instance, on the fourdrinier section of a paper machine, the vacuum level has traditionally been regulated according to the gloss of the pulp web. This has been practiced so that the operator of the paper machine knows from experience, on which stage of the fourdrinier section the pulp web should start to lose its gloss. The loosing of gloss means in practice that the water film on the surface of the pulp web is no longer uniform, but the amount of water in the web has been decreased to such an extent that almost all the water is absorbed into the web. When the felt of the paper machine starts to be clogged, the glazing part of the web increases, whereby an experienced operator knows that the vacuum level should be increased in order to absorb the desired amount of liquid from the web. However, this kind of regulation method is not the best possible, demanding accurate monitoring and regardless of that not providing the most accurate possible method of controlling the water removal. Neither does this monitoring method give a clear sign of the need to change the fabric of the paper machine, but the changing is also practiced based on experience, in most cases on the basis of the service life of the fabric. In other words, in practice a service life has been determined for each fabric, after which time the fabric is changed regardless of its actual condition.

By means of an adjustable-speed vacuum centrifugal pump, or a centrifugal exhauster, utilized in the vacuum system according to the invention, the vacuum level may be regulated by changing the rotational speed of the pump, whereby the capacity needed for creating the desired vacuum is optimized and power consumption is decreased, as the vacuum level is lower than in prior art solutions.

One of the most optimal running methods according to the invention in this kind of arrangement is to measure the moisture of the paper web after the press section prior to the drying section and try to maximize the dry solids content by regulating the vacuum in all suction objects at the same time. The appropriate vacuum level in each suction object and the relation of vacuums between various suction objects may be determined e.g. by means of an intelligent control system and fuzzy logic.

A second method of regulating the operation of water removal is to measure the discharging water amounts, for instance in a way described in Fl patent 97244, and regulate the vacuum levels accordingly. An essential point is that the aim is to maximize not the amount of water discharging from a single suction object but the total amount of water discharging from all suction objects.

A further essential feature of the vacuum arrangement according to the invention and the method applied in connection with it is that it may also be applied to monitoring the condition of the fabric. As already stated before, the permeability of the fabric changes in use both for clogging and compressing of the fabric. A sufficient change in permeability, possibly together with other factors, e.g. results of moisture measuring of the web and/or the fabric, signals the need to change the fabric.

As a second possibility for monitoring the condition of the fabric is trend monitoring (life-time control measurement) by utilizing the invention, which makes it possible to cormpare different fabrics and thus find the best possible fabric for each application. In other words, the invention makes it possible to compare e.g. between different paper fabrics from various producers or paper fabrics made of various materials as well as the applicability of different fabrics for different pulps.

Further, by utilizing the invention it is possible to monitor the operating condition of the pump, e.g. fouling, and signal it, based on data about the pump and its operation measured from the vacuum system and the performance chart of a new pump recorded in the system.

A new vacuum pump arrangement according to the invention, comprising a vacuum pump with adjustable rotational speed described e.g. in said Fl patent 97244, a suction object and a measuring and controlling system, eliminates e.g. the disadvantages of prior art methods described above and aims at optimizing water removal from various objects of application. A characteristic feature of the vacuum pump arrangement used in the invention is that it utilizes various information gathered about the operation of the pump, such as e.g. the rotational speed, power consumption and torque of the pump etc.

A characteristic feature of the arrangement according to the present invention applied e.g. in connection with a paper machine is that during the operation, the performance chart of the pump has been recorded into the control/central unit of the pump, e.g. in a form where both the rotational speed and the torque or power input of the pump are depicted in the vacuum—volume flow co-ordinate by groups of graphs, on basis of which co-ordinate the air flow being pumped is calculated based on measuring results (e.g. the rotational speed and torque or power input of the pump). On the basis of the air flow and measured vacuum level it is-then possible to calculate the permeability of the fabric on the suction box or the permeability of the fabric and the paper web together. This allows for monitoring changes in the density of the fabric or the paper web as a function of time and thus automatically carry out changes needed in the process or in the reconditioning of the fabric.

According to a preferred embodiment of the invention, the resistance function, i,e, the so-called resistance curve of the suction object is recorded in the memory of the control/central unit of the pump. The resistance function is preferably recorded in two different situations. Firstly, a resistance function $f_1$, is recorded in the memory of the control/central unit which resistance function comprises the initial state where the felt fabric or filter material, through which the medium is withdrawn by means of the pump, is new and un-clogged. According to a second preferable embodiment of the invention, also a resistance curve, i.e. resistance function, $f_2$ is recorded in the memory of the central unit, which resistance function comprises the same resistance components except that material, through which the vacuum is applied, such as the fabric or filter material, has been in use and is clogged. Said resistance functions are monitored during the operation of the vacuum pump system in relation to the operating point of the pump (rotational speed, vacuum level reached at the suction side at the rotational speed in question and the flow amount of pumped material reached at the corresponding vacuum level (e.g. m³/time unit). The operating point of the pump means the intersection of the resistance curve and the rotational speed curve. Thus, the aim is to control the pump so that its operating point is kept within the allowed area (between the graphs of the resistance functions) in the volume flow—vacuum co-ordinate. Another method of controlling the pump is that in accordance with the operating point e.g. the cleaning of the fabric of the paper machine is regulated (that is, e.g. when the resistance curve rises excessively, the use of cleaning sprays may be intensified or more cleaning sprays may be employed) and/or the rotational speed of the pump is regulated and thus, with clogging of the fabric, the rotational speed of the pump is accelerated.

According to a second preferable embodiment of the invention, the resistance functions $f_a$, $f_b$, $f_c$ of different types of felt may be recorded in the memory of the control/central unit 100 of the pump, and from the memory of the central unit of the pump said recorded functions $f_a$, $f_b$, $f_c$ may be utilized always when the type of felt is changed. Naturally, it is possible to record also the resistance function pairs, i.e. resistance functions of both new and clogged felt. Concerning various felts, it is also possible to practice long-term trend monitoring between different types of felt, on the basis of which trend monitoring the most suitable felt for each paper/paperboard pulp may be chosen.

The characteristic features of the control system for a vacuum pump and the method of regulating said pump according to the invention are described in the appended patent claims.

In the following, the invention is described with reference to present figures illustrating some preferred embodiments of the invention which, however, are not meant to restrict the invention.

Figure 1A:
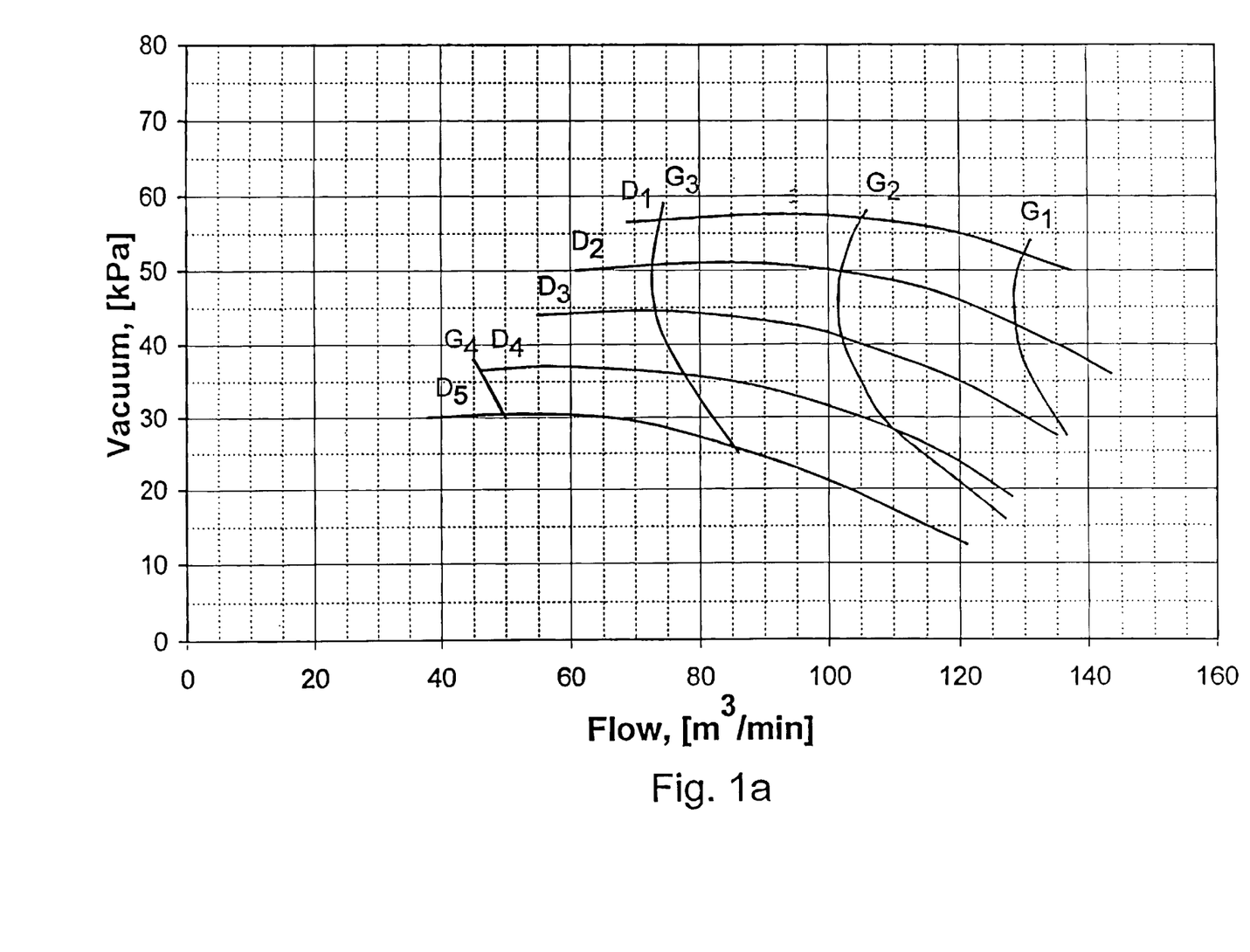
FIG. 1A illustrates the performance chart, the so-called characteristic curve, of a vacuum centrifugal pump, or a centrifugal exhauster. On the horizontal axis, the volume flow of the pump (the gas flow through the pump) is illustrated and on the vertical axis, the reached vacuum level in the suction side of the pump. Graphs G1, G2, G3 are torque curves and graphs D1, D2, D3 are rotational speed curves. At a certain torque and a certain rotational speed, a certain gas flow and subsequently a certain vacuum level is reached.

FIG. 1A illustrates the capacity, or the characteristic, curve of a vacuum pump on a system of co-ordinates where on the horizontal axis, the capacity of the vacuum pump, i.e. the volume flow (as flow through the pump), is depicted and on the vertical axis, the vacuum created by the vacuum pump. Vacuum pump 10 is preferably a vacuum centrifugal pump, or a centrifugal exhauster. The figure demonstrates both the constant speed curves D1, D2, D3 . . . and the constant torque curves G1, G2, G3 . . . As may be seen in the figure, in almost every case there is an explicit intersection point for a certain torque G and rotational speed D. When, in experimental conditions, determining the volume flow and the vacuum by changing both the rotational speed and torque (or power input, if desired) of the pump, performance chart according to FIG. 1A may be recorded in the control/central unit of the pump. After this, the operating point (volume flow and vacuum level) of pump 10 may be determined by measuring only the torque (or power input) and rotational speed of pump 10.

In practical conditions it is further possible to measure the actual vacuum level reached by means of the pump, on the basis of which the operating point of the pump may be checked and possible changes in the operation of the pump e.g. due to wearing or fouling may be stated.

The capacity curves of the pump may be corrected, if necessary, by measuring the temperature and moisture of the medium absorbed, such as air, because they affect the capacity rates as known per se.

Figure 1B:
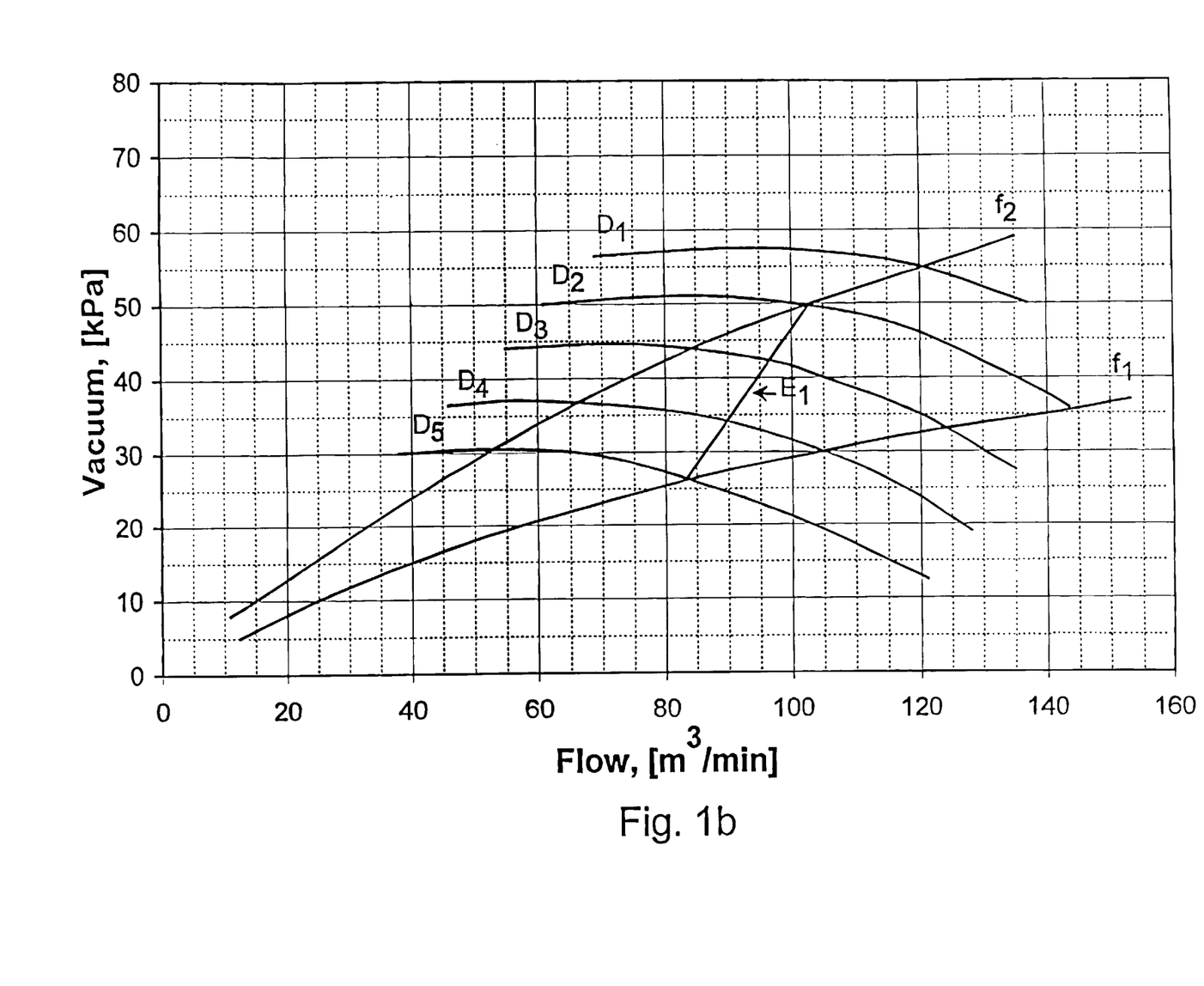
FIG. 1B demonstrates on a co-ordinate the determination of the operating point of a pump, on which co-ordinate on the horizontal axis, the volume flow of the pump is illustrated and on the vertical axis, the vacuum level in the suction side of the pump. Graphs $f_1$ and $f_2$ depicting said resistance functions and graph E depicting the transition of the operating point of the pump are marked on the co-ordinate.

According to the illustration of FIG. 1B, the operating point of a vacuum pump is determined in the system of co-ordinates familiar from the previous figure by the resistance curve f of the vacuum system together with rotational speed D. The operating point is settled on the intersection point of the rotational speed curve D and the resistance curve f. The form of the resistance curve f depends on the amount of air the vacuum system lets through at various vacuum levels. The form of the resistance curve i.e. flow resistance is effected on a paper machine e.g. by the flow resistances of the pulp web and the fabric, losses in piping, the position of a control valve possibly located in the piping etc. For instance, the resistance curve $f_1$ of a new (clean and bulky) felt is slightly ascending. A characteristic feature of it is that a slight increase in the vacuum level results in a remarkable increase in the volume flow. The resistance curve $f_2$ of an old (clogged and compressed) felt is steeper whereby a slight increase in the vacuum level brings only a slight increase in the volume flow.

In FIG. 1B, graphs $f_1$ and $f_2$ thus illustrate said resistance curves of the vacuum system. Graph $f_1$ illustrates the resistance curve of a new permeable material and $f_2$ illustrates the resistance curve of old, clogged material, such as felt. D1, D2, D3 are curves for rotational speed. Graph E1 of the figure demonstrates the changing of the operating point with the aging of the material. In order to achieve the same flow amount, it is necessary to increase the rotational speed of the pump. The direction of graph E1 is dependent on the change in the relation of the water amount being removed from the suction object to the flow amount of gas removed from the suction object as a function of vacuum.

When the felt ages, the volume flow of the vacuum centrifugal pump decreases, if its rotational speed is kept constant, as the flow resistance through the felt increases. If it is desired to keep the volume flow constant or increase it, the rotational speed of pump 10 must be increased. This is illustrated by way of example by graph E1, according to which an increase in the rotational speed of the pump increases both the vacuum level and the volume flow. This example is based on the fact that when the felt gets clogged, both a higher vacuum level and an increased volume flow are needed in order to maintain the moisture ratio of the felt or web density essentially constant. In practice, it may happen that an increase in the vacuum is as such sufficient when the aim is essentially constant water removal, whereby increasing the rotational speed of the pump keeps the volume flow constant. The operating point of pump 10 may be adjusted during the service life of the felt in accordance with the invention. Said regulation may be carried out according to the invention on the basis of measurements (e.g. water amount discharging from the felt, moisture of the web). The resistance curve of the fabric illustrated in FIG. 1B is measured by changing the rotational speed of the pump and measuring its capacity i.e. volume flow at different rotational speeds. In practice, according to a preferred embodiment of the invention, new fabric is measured in order to determine its characteristics i.e. resistance curve. By carrying out the same measurements for fabrics of various materials or produced by various producers, different fabrics may be compared to each other. When the corresponding resistance curve is measured for an old and clogged felt, said information may be utilized to signal to the operating personnel of the paper machine the need to change the felt. Further, it is possible to add to the system life-time monitoring of the felt, whereby said monitoring indicates possible unexpected changes in the condition of the felt during normal service life.

If not all suction objects (or all machines) are equipped with said regulation method based on continuous measuring, an optimal running method may be determined e.g. on one machine by exact measurements or based on other experience. The essential point is that the operating point of the vacuum pump must be changed (that is the vacuum level must be increased) during the service life of the felt in order to optimize, in most cases maximize, the total water removal and to increase the service life of the felt.

The changing of the operating point, preferably in felt conditioning, by the aging of the felt may be carried out with a vacuum centrifugal pump with adjustable speed e.g. as follows:

1) Constant volume flow.

On the basis of a pre-measured capacity curve it is known which rotational speed—torque pair corresponds to the desired volume flow. By constantly measuring the rotational speed and torque of the pump and changing the rotational speed if necessary, the desired volume flow may be maintained.

2) Increasing the rotational speed as a function of time becomes actual especially in situations where more precise measuring equipment, for instance a transducer for measuring the moisture of the felt, is not available and the presumption is that the clogging of the felt proceeds linearly and increasing the rotational speed evenly compensates for the clogging of the felt to a sufficient degree of accuracy. Of course, the clogging of the felt may also proceed non-linearly in relation to time, whereby the change of the rotational speed should not be constant during the whole service life of the felt in a certain period, but possible various changes may be pre-determined in the control/central unit.

3) Increasing the vacuum level as a function of time becomes actual especially in situations where more precise measuring equipment, for instance a transducer for measuring the moisture of the felt, is not available and the presumption is that the clogging of the felt proceeds linearly and increasing the vacuum level evenly compensates for the clogging of the felt to a sufficient degree of accuracy. Of course, changes in the vacuum level do not have to be constant during the whole service life of the felt in a certain period of time, but possible various changes may be pre-determined in the control/central unit.

4) Optional operating point transition curve

When the rotational speed—torque pairs corresponding to each operating point are known, the pump may be programmed to follow the desired operating point transition curve E. Moving on the curve E from one operating point to another takes place by the changing of the resistance curve of the fabric. Alternative 1) is a special case of this, where the transition curve is a vertical line on the volume flow— vacuum co-ordinate. The operating point transition curve may be linear, a line segment, a parabola or a fraction line. In other words, the transition curve may be a graph of a second or higher degree function on said volume flow—vacuum co-ordinate.

In other words, the optimal operating point transition curve E for some suction object e.g. in a paper machine is determined by measuring the discharging water amount and/or the moisture of the pulp web or the fabric and at the same time regulating the rotational speed of pump 10 in order to achieve an optimal amount of discharging water or an optimal moisture of fabric and recording in the memory of the control/central unit 100 the optimal operating points by the changing of resistance function f of the suction side. The optimal operating point transition curve determined by measuring as described is scaled into different suction objects e.g. on a paper machine in an appropriate relation according to the free flow area of the suction box and speed of the fabric.

Figure 1C:
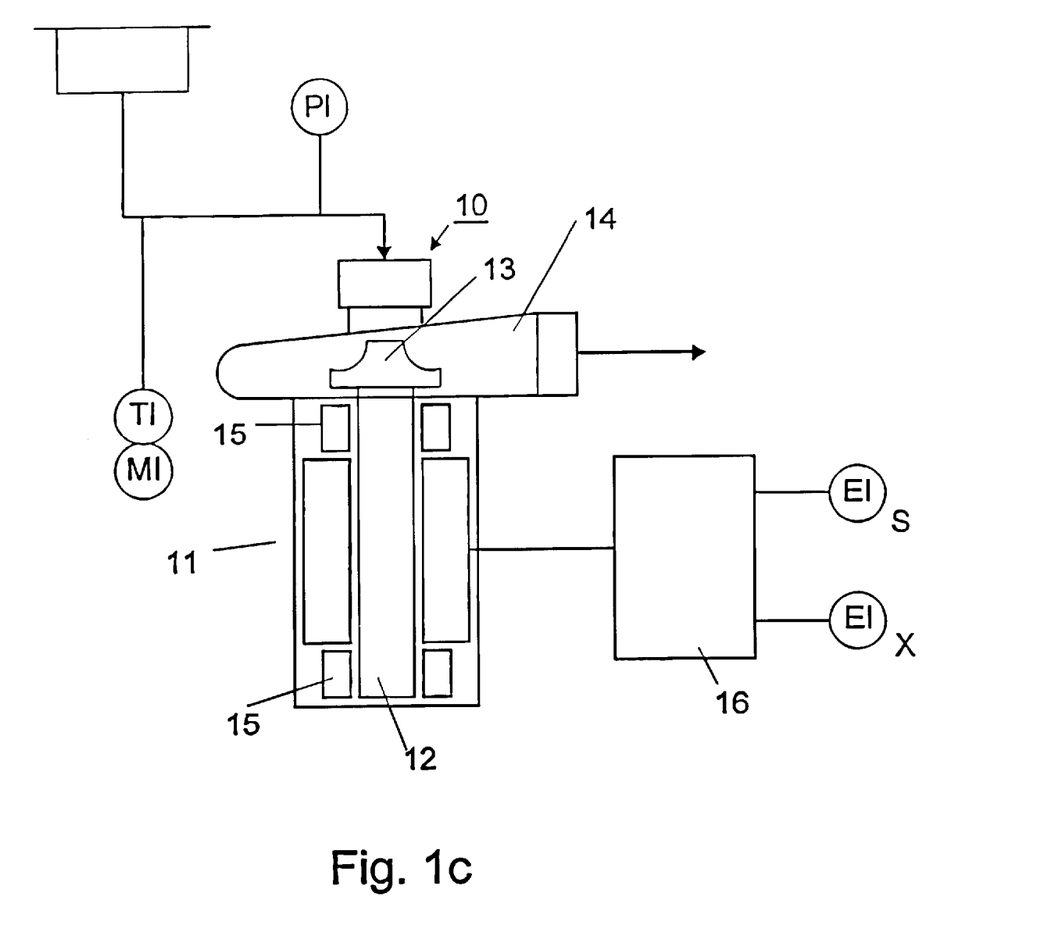
FIG. 1C demonstrates a vacuum pump according to the invention and regulation/measuring apparatus related to it according to a preferred embodiment of the invention.

FIG. 1C illustrates the construction and instrumentation of pump 10. The construction of the vacuum pump with adjustable rotational speed 10 is e.g. a vacuum centrifugal pump, or a centrifugal exhauster, illustrated in the appended figure, the main components of which are a motor 11, an impeller 13 mounted on the shaft 12 of the motor, a spiral casing 14 and a bearing arrangement 15. The rotational speed of the motor 11 of the pump 10 is adjusted by means of an AC inverter 16, by means of which e.g. the rotational speed and torque (or power input) of pump 10 may be measured.

Figure 2A:
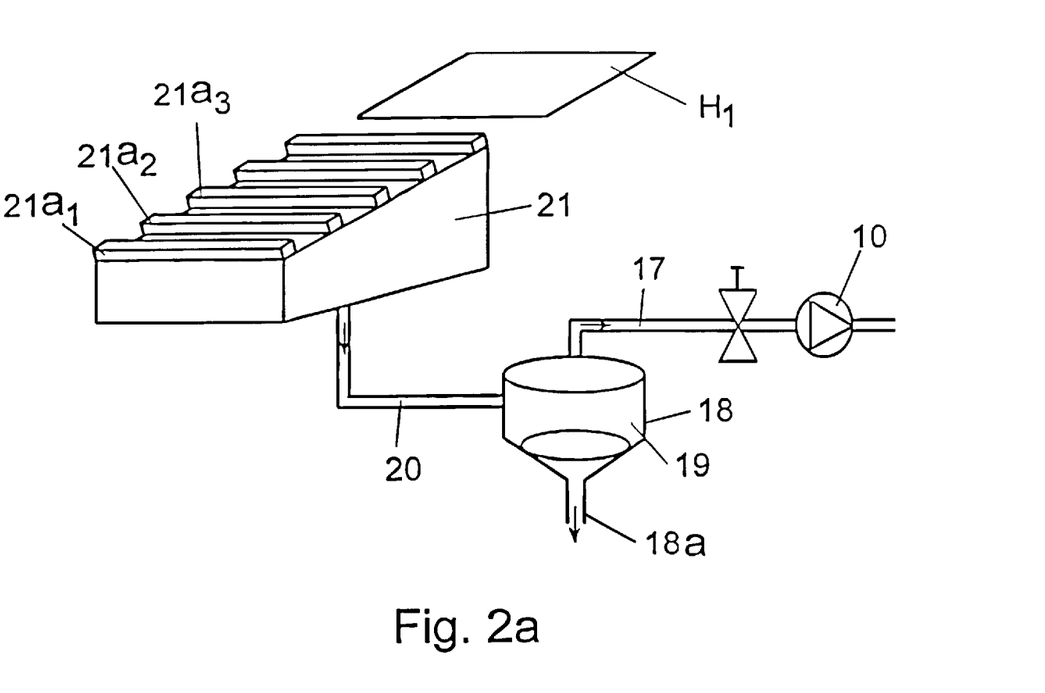
FIG. 2A illustrates an arrangement according to a second preferred embodiment of the invention as an example in connection with the suction box of the felt conditioning section of a paper machine.

The measurements of pump 10 may be arranged e.g. according to said FIG. 1C. Measurements marked in the figure are Pl measuring the suction side vacuum
Tl measuring the temperature of withdrawn air
Ml measuring the moisture of withdrawn air
El(S) measuring the rotational speed of the pump
El(X) measuring the torque of the pump FIG. 2A illustrates a vacuum pump arrangement according to the invention connected as an example to the suction box of a paper machine, Said vacuum pump arrangement comprises a vacuum pump with adjustable rotational speed 10, preferably a high-speed pump and most preferably a high-speed vacuum centrifugal pump, connected to a suction channel 17 which suction channel is further connected to a water separator 18. By means of pump 10 vacuum is created in the inner space 19 of water separator 18 and further a mixture of water and gas is led through suction channel 20 to water separator 18 from suction box 21 facing fabric H1 of the paper/paperboard machine. In the water separator, the mixture of water and gas is divided into an essentially water-free gas fraction and water, and the gas fraction is withdrawn through channel 17 into vacuum pump 10 and via it out of the system.

From the fabric, such as the felt H1 of a paper or paperboard machine, mixture of water and gas is withdrawn to the inner space of suction box 21 through slots between foils 21a1, 21a2 . . . of suction box 21. The water is further transferred by means of vacuum into water separator 18, into its inner space 19 wherefrom the water is discharged through outlet 18a. By means of suction box 21, water is removed also from pulp web M on the felt. In that case, pulp web M is on the fabric of a paper or paperboard machine, such as wire H1, and water-removal from the pulp web takes place through the wire H1 to the inner space of suction box 21 and further to said water separator 18. Water removal may be regulated, if desired, e.g. by means of control valves (not shown).

The arrangement according to FIG. 2A comprises measuring transducers illustrated in the description of FIG. 1C which are needed to provide information at least on the rotational speed and torque (or alternatively power input) of the pump. Data provided by said transducers is recorded in the memory of the central/control unit 100 of the pump wherein also the resistance function $f_1$ of felt H1, i.e. the resistance function of a new and unused felt, shown in FIG. 2A, is recorded. Preferably, also the resistance function $f_2$ of a clogged felt is recorded in the memory of the control/central unit. The resistance function $f_1$ has been recorded in the memory of the central unit 100 by running the pump at various rotational speeds and recording in the memory of the central unit 100 the vacuums corresponding to each rotational speed and reached in the suction side of the pump, between the pump and the felt, and the withdrawn gas amount $m^3$/min related to the vacuum. On the basis of data provided by the control/central unit 100 and said measuring data and data recorded in the memory of the unit, the rotational speed of the pump is further changed in a way determined by the control/central unit 100.

When running a paper/paperboard machine according to a second preferred embodiment of the invention, the rotational, or revolution speed of the pump 10 as well as the vacuum level and flow amount reached at that speed are being constantly measured.

According to the invention the rotational speed may be increased when the flow amount is reduced or vice versa, whereby the pump is controlled by the central unit 100 on the basis of measuring results and, e.g., when the felt starts to get clogged the central unit increases the rotational speed of the pump, thus in a controlled way displacing the operating point of the pump so that the paper manufacturing process is not disturbed by the incipient clogging of the felt. The quality of paper remains good, as the amount of water removed from the felt is kept under control, preferably essentially constant, during the whole paper manufacturing process.

When the resistance function $f_1$ of a new fabric of a paper/paperboard machine, such as the felt H1 or the wire, is measured, the resistance curve of said function may be measured also during the operating time of the pump, that is for instance during the operation of a paper/paperboard machine, whereby the resistance function comprises not only the resistance created by the felt but also other resistances, such as the resistance created by the pulp web, valves or another felt. An essential thing is that when making comparisons in this situation, the comparison must be done also in relation to a clogged felt H1 with the corresponding resistance components, such as the pulp web, valves in certain adjustment positions, piping etc. in connection with it. A characteristic feature of the arrangement according to the invention is that the condition of the fabric of a paper machine or a corresponding filtering apparatus is being monitored during its operation and adjustment of the rotational speed of pump 10 and/or change of the felt are carried out based on said monitoring.

Figure 2B:
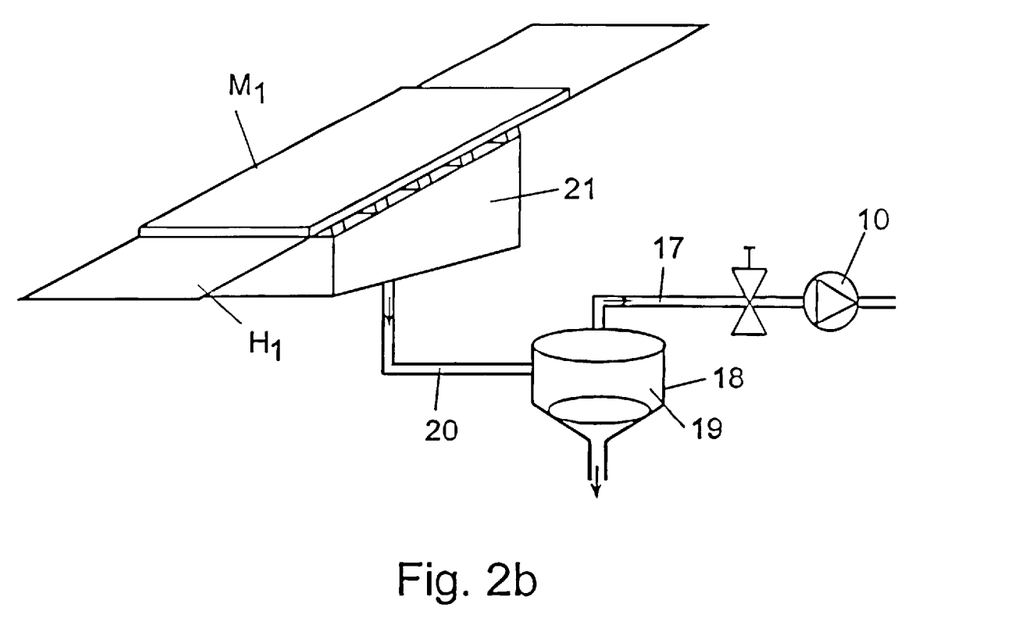
FIG. 2B illustrates an arrangement of the type of FIG. 2A as an example in connection with the suction box of the so-called wire part of a paper machine, where the felt of the paper machine and the pulp web together form a resistance which is being monitored in the arrangement according to the invention.

FIG. 2B illustrates a preferred embodiment of the invention. In the embodiment of FIG. 2B, the resistance functions $f_1$ and $f_2$ are measured and recorded during the operation of a paper/paperboard machine in a running situation where the pulp web M. is on the fabric H1 of the paper machine.

Figure 2C:
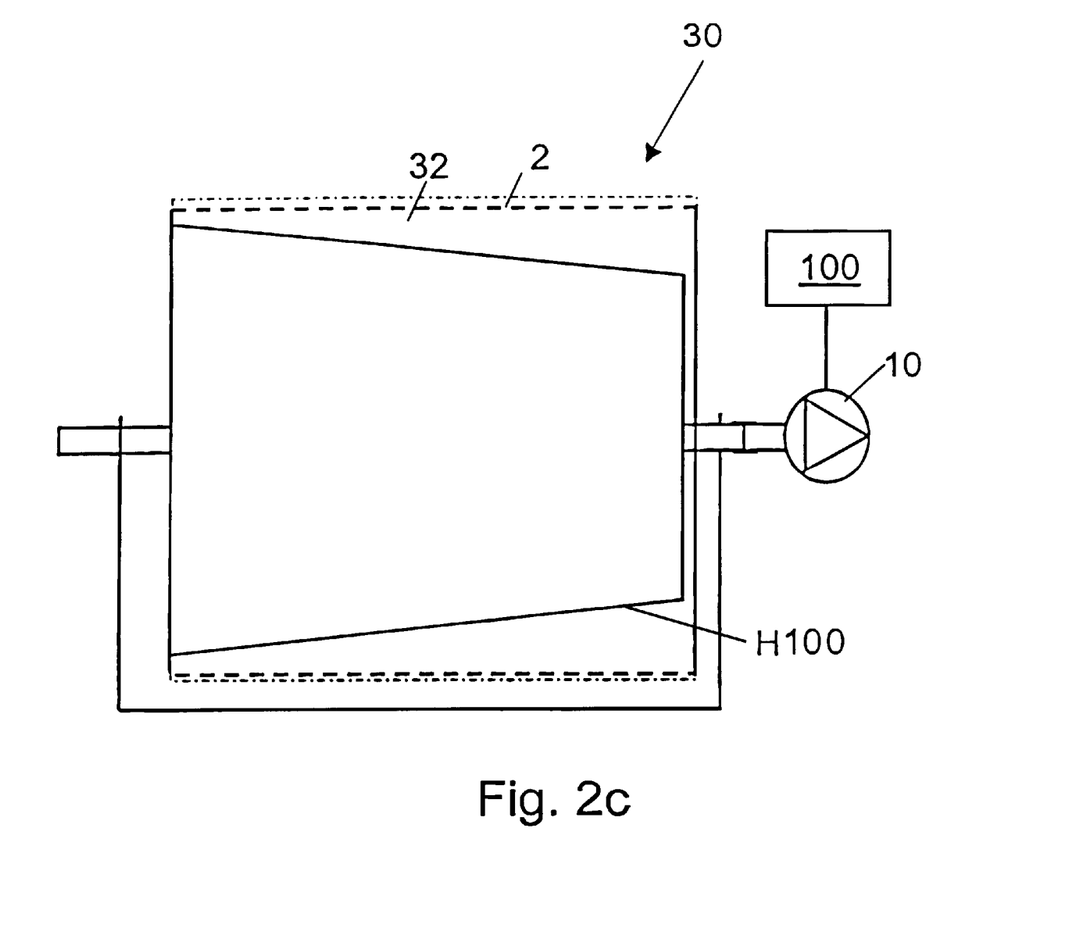
FIG. 2C illustrates a vacuum pump system according to a third preferred embodiment of the invention as an example arranged in connection with a suction filter of the pulp industry.

FIG. 2C illustrates a vacuum pump arrangement according to a preferred embodiment of the invention in connection with filtering material H2. The figure illustrates schematically a vacuum drum filter 30 with filtrate compartments 32 arranged under its perforated or wire-like surface H100 to which filtrate compartments the vacuum is applied by vacuum pump 10. The method in the controlling of the pump 10 corresponds to the embodiments illustrated in FIGS. 2A and 2B, i.e. in embodiments meant for liquid removal through the fabric of a paper machine.

As shown in FIG. 2C, vacuum pump 10 withdraws liquid through material H2 which is preferably filtration material and the material to be filtered is located on the other side of the filtration material in space F. In this embodiment, too, it is possible to measure the resistance curve of filtration material H2 during the use of the filter first, when the filter is new. The resistance curve i.e. the vacuum in the suction side of the pump related to material H2 and the according flow amount as well as the rotational speed dependencies of the pump have been recorded in the memory of the central unit 100 and, accordingly, the corresponding data of a clogged filter. This embodiment, too, allows for adjusting the pump, its speed, on the basis of operating point data gathered by measurements and when a certain non-allowed operating point is reached, the central unit signals it, whereby the pump is stopped and the filter must be cleaned, reconditioned or changed. The allowed operating range of the pump is the range between the resistance curve $f_1$ of the new material H2 and the resistance curve $f_2$ of the clogged material H2. Material withdrawn by the pump may be air, gas, liquid or their mixture, in filtration it is always a mixture of gas and liquid. Thus, in the most common embodiment of the invention the material withdrawn by the pump is not restricted to e.g. air.

As obvious from the above, the vacuum pump arrangement according to the invention may be utilized in other areas than the paper industry, too. For instance, various vacuum filters are used for increasing the consistency of fiber pulp or sludge in a number of different industrial processes. The filters may be e.g. of drum or disc filter type. In relation to a vacuum pump, this kind of process may be considered as corresponding to the fabric +pulp web -case on a paper machine. The function of the filter is to remove enough liquid from the pulp to achieve the desired dry solids content. Thus, the optimal running method is to measure the dry solids content after the filter and regulate the vacuum correspondingly.

Figure 2D:
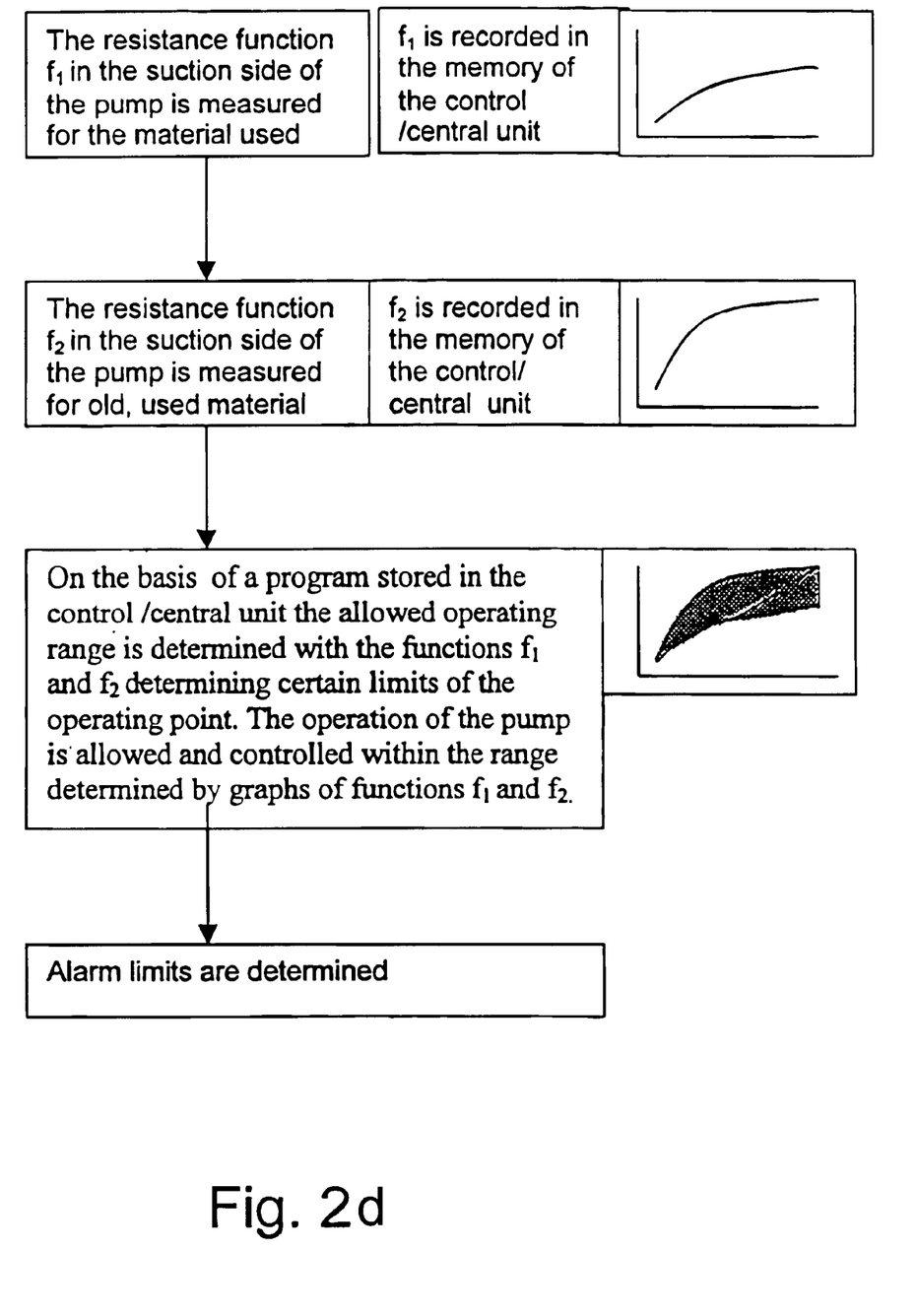
FIG. 2D illustrates as a schematic diagram the operation of a vacuum pump arrangement according to the invention.

FIG. 2D demonstrates the use of the vacuum pump system according to the invention. In the block diagram in stage a) the specific resistance function $f_1$ of the suction side of the pump 10, i.e. the so-called resistance curve, is recorded in the memory of the control or central unit 100 of the pump 10 at various rotational speeds with the suction applied through new presently implemented material H1, H2. Thus, at a certain rotational speed the vacuum reached in the suction side of the pump and the reached flow amount corresponding to the vacuum level, e.g. m³/min, are recorded. In stage b), the specific resistance function $f_2$ i.e. the resistance curve, of clogged material H1, H2 is recorded in the central unit 100 of the pump 10. In stage c) the allowed operating ranges of the apparatus in general, the vacuum level and the corresponding flow amount, are determined by the microprocessor of the central unit 100. In stage d) the alarm limits are determined, i.e. the value pairs i.e. operating ranges wherein the system and the pump should not be operating, whereby on the basis of said alarm the fabric may be changed. If the resistance curve rises above $f_2$, changing the rotational speed does not enable to get it down, but the only chance is to change or recondition the fabric of the paper or paperboard machine or the wire surface or perforated surface of the filter.

During the operation of the vacuum pump system, the torque and speed of the pump are measured, whereby, with the performance chart of the pump recorded in the memory of the control/central unit 100 of the pump, on the basis of said measured data it is possible to calculate directly the vacuum level in the suction side of the pump corresponding to each torque and rotational speed of the pump and the flow amount relating to said vacuum level, using the microprocessor 100 of the pump or an external processor. The realized vacuum level in the operating points of the pump 10 and the corresponding flow amount may be calculated on the basis of the intersection points of the torque and rotational speed curves of the pump.

Thus, each actual operating point of the pump may be compared to the allowed operating points and give the alarms and/or control the pump based on said operating point data and comparison carried out afterwards.

According to FIGS. 2A, 2B and 2C, when recording the resistance functions in the memory of the control/central unit 100 of the pump, it is possible to record the vacuum—flow amount pairs in the memory of the machine by measuring the vacuum corresponding to each rotational speed of the pump and the related flow amount. It is also possible to carry out the recording so that said data is measured only at certain points and a function approximating the points in question is formed using e.g. some digital method. In that case, there may be a certain restricted amount of measuring points and regardless of that it is possible to create a function, the continuous graph of which passes through said measuring points and value pairs. The formed function is a polynomial function, the degree of which is determined based on the measuring points used (value pairs; vacuum; flow amount).

Further, one has to bear in mind that only a few preferable embodiments of the invention have been described in the above with no aim at restricting the invention to said embodiments only. Thus, regardless of the point that only vacuum level has been mentioned, the invention comprises also situations where the gas withdrawn by the vacuum pump is not returned directly to the atmosphere, but to an object creating a counter-pressure, whereby a more correct term to use would be pressure difference prevailing over the pump. In other words, the term "vacuum"in the application should be understood as a vacuum created by the pump not depending on which pressure (atmospheric pressure or counter-pressure of the outlet side of the pump) it is compared to. In this kind of case it is natural to equip both the suction and outlet sides of the pump with a pressure transducer to determine the pressure difference prevailing over the pump.

As noticed from the above, a totally new method of controlling the operation of a pump has been developed. Only a few preferred embodiments of the method were described in the text, which in no way are meant to restrict the invention from what is recited in the appended claims.

What is claimed is:

1. A vacuum pump assembly for removing liquid through a surface with openings therein, comprising:

a vacuum pump having an adjustable rotational speed, an operating point indicative of a desired rotational speed, and a controller maintaining the adjustable rotational speed at the desired rotational speed indicated by the operating point;

a suction side of said vacuum pump operatively connected to said surface to withdraw fluid from said surface, wherein said suction side is subject to a suction resistance of the withdrawn fluid comprising at least a withdrawn fluid resistance caused by said surface, and the suction resistance is indicated by a resistance function variable with the rotational speed of said vacuum pump;

wherein the resistance function is determined by recording operating points of the vacuum pump at various rotational speeds for a certain level of the withdrawn fluid resistance;

wherein said controller includes a central processing unit having an electronic memory storing a performance chart of the vacuum pump and said resistance function of the suction side of said vacuum pump, and said central processing unit determines the operating point based on the performance chart and the resistance function.

2. A vacuum pump assembly as in claim 1 wherein the resistance function is a plurality of functions, wherein each of said functions is determined for a different level of withdrawn fluid resistance.

3. A vacuum pump assembly as in claim 1 wherein the resistance function of the suction side of the vacuum pump is recorded in the electronic memory while the pump is equipped with means for measuring a volume flow through the pump, and the suction side of the pump is equipped with means for measuring a vacuum on the suction side.

4. A vacuum pump assembly as recited in claim 1 wherein changes in a permeability of said surface effect changes in said suction resistance, which changes in suction resistance are recorded in the memory.

5. A vacuum pump assembly as recited in claim 1 wherein the operating point of said vacuum pump is in an allowed operating range bounded by a plurality of said resistance functions, wherein said resistance functions depict a vacuum level in said suction side of said vacuum pump for a corresponding rotational speed and a corresponding fluid flow rate from said surface.

6. A vacuum pump assembly as recited in claim 5 wherein said surface comprises a fabric of a paper or paperboard machine.

7. A vacuum pump assembly as recited in claim 5 wherein said surface comprises a surface of a drum filter with openings therein, or a filter sector of a disc filter with openings therein.

8. A vacuum pump assembly as recited in claim 5 wherein said fabric has a pulp web thereon.

9. A vacuum pump assembly as recited in claim 5 wherein said surface comprises a filtering surface of a suction filter and a pulp web associated therewith.

10. A vacuum pump assembly as recited in claim 5 wherein said surface comprises a water separator operatively connected to a suction box of a paper machine felt or wire.

11. A vacuum pump assembly as recited in claim 1 wherein said surface comprises a fabric of a paper or paperboard machine.

12. A vacuum pump assembly as recited in claim 1 wherein said surface comprises a surface of a drum filter with openings therein, or a filter sector of a disc filter with openings therein.

13. A vacuum pump assembly as recited in claim 1 wherein said surface comprises a water separator operatively connected to a suction box of a paper machine felt or wire.

14. A vacuum pump assembly as recited in claim 1 wherein said surface comprises a filtering surface of a suction filter and a pulp web associated therewith.

15. A vacuum pump assembly for removing liquid through a surface with openings therein, comprising:

a vacuum pump having an adjustable rotational speed, an operating point indicative of a desired rotational speed, and a controller maintaining the adjustable rotational speed at the desired rotational speed indicated by the operating point;

a suction side of said vacuum pump operatively connected to said surface to withdraw fluid from said surface, wherein said suction side is subject to a suction resistance of the withdrawn fluid and the suction resistance is indicated by a resistance function variable with the rotational speed of said vacuum pump;

wherein said controller includes a central processing unit having an electronic memory storing a performance chart of the vacuum pump and said resistance function of the suction side of said vacuum pump, and said central processing unit determines the operating point based on the performance chart and the resistance function, and wherein said resistance function includes a first resistance function and a second resistance function, said first resistance function corresponding to an unused surface with high permeability, and said second resistance function corresponding to a used surface having low permeability.

16. A vacuum pump assembly as recited in claim 15 wherein the second resistance function corresponds to a surface needing to be reconditioned, repaired, cleaned or changed.

17. A vacuum pump assembly as recited in claim 15 wherein said operating point is between the first and second resistance functions.

18. A vacuum pump assembly for removing liquid through a surface with openings therein, comprising:

a vacuum pump having an adjustable rotational speed, an operating point indicative of a desired rotational speed, and a controller maintaining the adjustable rotational speed at the desired rotational speed indicated by the operating point;

a suction side of said vacuum pump operatively connected to said surface to withdraw fluid from said surface, wherein said suction side is subject to a suction resistance of the withdrawn fluid and the suction resistance is indicated by a resistance function variable with the rotational speed of said vacuum pump;

wherein said controller includes a central processing unit having an electronic memory storing a performance chart of the vacuum pump and said resistance function of the suction side of said vacuum pump, and said central processing unit determines the operating point based on the performance chart and the resistance function, and further comprising an operating point transition curve recorded in said electronic memory.

19. A vacuum pump assembly as recited in claim 18 wherein said operating point transition curve tracks said operating point.

20. A vacuum pump assembly as recited in claim 18 wherein said transition curve is bound by said resistance function which comprises a first resistance function and a second resistance functions, wherein said first resistance function corresponds to an unused surface with high permeability, and said second resistance function corresponds to a used surface having low permeability.

21. A method for controlling a vacuum pump with an adjustable rotational speed, an operating point, and a central processing unit having an electronic memory, wherein said memory stores data regarding a performance chart of the pump, and said pump further includes a suction side operatively connected to a porous surface from which flows liquid to the suction side from said surface and from a web on said surface, said method comprising:

(a) generating the performance chart representing pump performance, wherein the chart indicates a relationship between pump volume flow and pump suction side vacuum, and said chart is generated using data of the actual operation of the vacuum pump, (b) generating at least one predetermined transition curve representing a desired change in the operating point to compensate for variations in a permeability of the porous surface;

(c) monitoring data indicating current pump performance and a current permeability condition of the porous surface;

(d) determining by the central processing unit an actual operating point of the vacuum pump based on the monitored data;

(e) comparing in the central processing unit the actual operating point to the performance chart including the transition curve; and (f) adjusting the pump rotation speed to conform the actual operating point to said at least one predetermined transition curve as the permeability of the porous surface changes.

22. A method as recited in claim 21 wherein the at least one transition curve is a constant volume flow curve.

23. A method as recited in claim 21 practiced so that the transition curve of the operating point is a vertical line on a volume flow—vacuum co-ordinate.

24. A method as recited in claim 21 practiced so that the transition curve of the operating point is a line segment or fraction line passing through two or more determined-points on a volume flow—vacuum co-ordinate.

25. A method as recited in claim 21 practiced so that the transition curve of the operating point is a graph of a second or higher degree function on the volume flow—vacuum co-ordinate.

26. A method as recited in claim 21 wherein the at least one predetermined transition curve is determined by (g) determining an optimal operating point of the pump corresponding to a predetermined volume of discharge of water from the surface or of moisture content of the surface, (h) recording the optimal operating point in memory as a point on the curve, and repeating steps (g) and (h) for various resistance levels in the suction side of the pump.

27. A method as recited in claim 26 practiced using as the surface a fabric, with pulp web, of a paper or paper board machine.

28. A method as recited in claim 27 practiced so that the optimal transition curve of the operating point is scaled to various surfaces of a paper machine in an appropriate ratio according to a free flow space of the paper machine suction box and velocity of the fabric.

29. A method as recited in claim 21 further comprising measuring a vacuum associated with the pump by measuring a pressure difference prevailing over the pump.

30. A method as recited in claim 21 wherein a plurality of surfaces are provided associated with a paper machine having a press section, drying section, and paper web, and the surfaces are operatively connected to a common central processing unit; and further comprising measuring the moisture of the paper web after the press section and prior to the drying section, and maximizing the dry solids content of the paper web by regulating the vacuum applied to all of the surfaces at the same time.

31. A method for controlling a vacuum pump assembly including a central processing unit with an electronic memory and an adjustable rotational speed vacuum pump, wherein the memory stores a performance chart applied to control an operating point of the pump, and said vacuum pump having a suction side operatively connected to a plurality of porous surface in a paper machine having a press section, drying section and a paper web moving over said porous surfaces, said surfaces connecting to a common suction system and having openings therein for removing liquid through said surfaces due to said vacuum pump suction side, said method comprising:

(a) generating the performance chart based on data indicative of actual operation of the vacuum pump;

(b) collecting data to determine an actual operating point of the vacuum pump and said data indicative of a condition of the porous surface;

(c) determining by the central processing unit the actual operating point of the vacuum pump based on the collected data;

(d) comparing the actual operating point to the performance chart of the vacuum pump;

(e) constraining the actual operating point of the vacuum pump to a predetermined transition curve relating volume flow to vacuum on the performance chart, said operating point being constrained by adjusting the rotational speed of the pump as changes occur in a resistance of the suction side of the pump;

(f) measuring a moisture content of the paper web after the press section and prior to the drying section, and wherein said controller maximizes a dry solids content of the paper web by regulating a vacuum applied by said suction side to said porous surfaces simultaneously, and (g) wherein the vacuum is regulated by applying an intelligent control system and fuzzy logic to search for a vacuum level for each surface and a relation of vacuum levels between different surfaces.

32. A method for controlling a vacuum pump assembly including a central processing unit having an electronic memory, and an adjustable rotational speed vacuum pump having an operating point and a performance chart and a suction side operatively connected to a porous surface with openings therein used for removing liquid through the surface, said method comprising:

(a) generating the performance chart of the vacuum pump based on actual pump operation;

(b) generating at least one suction resistance function indicative of flow resistance of a said porous surface and storing the resistance function in said electronic memory;

(c) collecting data indicative of a current operating point of the vacuum pump, wherein said data is indicative of a flow from said surface;

(d) comparing the current operating point to the at least one resistance function; and (e) adjusting the current operating point of the vacuum pump to conform to an operating range defined at least in part by said at least one resistance function.

33. A method as recited in claim 32 wherein, in step (b), recording at least two resistance functions in the electronic memory of the central processing unit, a first resistance function relating to a new, unused surface and a second resistance function to a surface which has been in use and needs to be reconditioned, repaired, cleaned or changed.

34. A method as recited in claim 32 wherein said operating points are maintained within an area defined by said first and second resistance functions.

35. A method for controlling a vacuum pump with an adjustable rotational speed and said pump having a central processing unit having an electronic memory, wherein said electronic memory stores a data regarding a performance chart of the pump, and said pump further includes a suction side operatively connected to a porous surface through which flows liquid to the suction side from a web, said method comprising:

(a) using actual operating data of the vacuum pump generating a first predetermined resistance curve representing pump performance with an unclogged felt for various values of pump flow and pump vacuum and a second predetermined resistance curve representing pump performance with a clogged felt for various values of pump flow and pump vacuum;

(b) monitoring data indicating current pump performance, the data including information indicative of pump speed and pump torque;

(c) determining by the central processing unit an actual operating point of the vacuum pump based on the monitored data;

(d) comparing in the central operating unit the actual operating point to the first predetermined resistance curve and to the second predetermined resistance curve; and (e) adjusting the pump rotation speed such that the actual operating point is within the range defined by the first predetermined resistance curve and to the second predetermined resistance curve.

* * * * *